FIG. 1

INVENTORS
JINDRICH KOPECEK
SRINIVASA SOURIRAJAN

By

ATTORNEYS

INVENTORS
JINDRICH KOPECEK
SRINIVASA SOURIRAJAN
ATTORNEYS

FIG. 5

INVENTORS
JINDRICH KOPECEK
SRINIVASA SOURIRAJAN

By
ATTORNEYS

United States Patent Office 3,536,612
Patented Oct. 27, 1970

3,536,612
INCREASING PERMEABILITY OF REVERSE OSMOSIS MEMBRANES
Jindrich Kopecek and Sprinivasa Sourirajan, Ottawa, Ontario, Canada, assignors to Canadian Patents and Development Limited, Ottawa, Ontario, Canada, a company of Canada
Filed Oct. 28, 1968, Ser. No. 770,943
Int. Cl. B01d 13/00
U.S. Cl. 210—23      20 Claims

ABSTRACT OF THE DISCLOSURE

The treatment of a reverse osmosis membrane prior to or during its use in a reverse osmosis separation, the treatment comprising contacting one side of the membrane, from which liquid passing through the membrane is withdrawn in said reverse osmosis separation, with a liquid at a pressure and for a time sufficient to substantially increase the permeability of the membrane during the reverse osmosis separation i.e., increase the product rate without substantially reducing the separation factor.

---

The present invention relates to reverse osmosis membranes and in particular to a method of treatment of said membranes whereby said membranes in a subsequent reverse osmosis separation of a solvent from a solution has substantially increased permeability for said solvent without substantial reduction in its separation factor, i.e. its ability to separate the solvent from the solution.

Reverse osmosis processes for the separation of solvents from solutions such as the separation of water from aqueous solutions of inorganic salts are known. A typical process involves feeding the solution to one particular side of the reverse osmosis membrane at a pressure exceeding the pressure difference across said membrane, the solvent e.g. water being preferentially forced through the membrane, which is capable of preferentially rejecting the solute, e.g. the dissolved salt and the solvent is collected from the other side of the membrane separately from the concentrated solution. Reverse osmosis separation has particular application to the demineralization (desalination) of sea water and such application is disclosed for example in U.S. Pats. Nos. 3,250,701 and 3,355,382 where sea water is fed to the reverse osmosis membrane under pressure. The present invention will be described primarily with reference to the demineralization of saline brackish or sea waters, although as is known reverse osmosis separation is generally applicable to the separation of solvents from solutions, such as inorganic salts or organic substrates in water and organic substrates in organic solvents, the condition of separation being determined by inter alia the membranes selected and the pressure applied depending upon the particular solution from which the solvent is to be separated.

As disclosed in U.S. Pat. No. 3,250,701, it has been found for the separation of water from aqueous solutions containing inorganic salts such as sea water that porous cellulose ester membranes are particularly suitable in that although relatively high pressures are necessary in the reverse osmosis separation of the order of 600 to 1500 pounds per square inch, the salt rejection, i.e., the separation factor is high and the product rate, i.e. the rate of permeation of the water through the membrane is good. Particularly suitable membranes for use in the separation of solvents from solutions, particularly in the de-salination of saline waters, as well as their preparation are the asymmetric porous cellulose acetate membranes disclosed inter alia in U.S. Pats. Nos. 3,133,132 and 3,133,137 as well as Sourirajan, S. Ind. Eng. Chem. Fundamentals 2, 51 (1963) and Loeb, S. and S. Sourirajan, Advan. Chem. Ser. No. 38, 117 (1963).

In particular, in U.S. Pat. No. 3,133,132 there is disclosed a method of preparing a porous membrane adapted to separate solvents from solutions comprising dissolving a film forming cellulosic ester and an aqueous solution of a pore producing agent in an organic solvent, casting the solution to form a membrane of substantially uniform thickness, evaporating a portion of the organic solvent for predetermined periods of time, said casting and evaporating being accomplished with said solution cooled below room temperature and immersing the cast membrane in water to remove the pore producing agent. The pore producing agent is suitably a perchlorate, such as magnesium or sodium perchlorate or formamide. The cellulosic ester is suitably cellulose acetate or cellulose acetate butyrate, particularly cellulose acetate and the organic solvent may preferably be methyl-ethyl-ketone, acetone, ethanol or methanol. The solution may be cooled to a temperature in the range −7.5 to −16° C. In the production of particular asymmetric cellulose acetate reverse osmosis membranes according to the aforesaid process the film casting solution containing cellulose acetate dissolved in acetone has an additive, such as formamide or an aqueous solution of magnesium perchlorate, which is soluble in water and does not adversely affect the solubility of the cellulose acetate in acetone added thereto. Membranes are cast on flat glass plates or in glass or metal tubes from the above solution at ambient or lower temperatures and after casting part of the solvent is allowed to evaporate in air from the surface of the membrane. This is followed by immersing the membrane in ice-cold water for at least an hour during which time gelation occurs and the additive is leached out leaving a tough solid porous asymmetric membrane on the plate or tube from which the membrane can be easily removed. The following Table I gives conditions for casting three typical membranes.

TABLE I

| | I | II | III |
|---|---|---|---|
| Composition (wt. percent): | | | |
| Cellulose acetate (acetyl content 39.8%) | 17 | 22.2 | 25 |
| Acetone | 68 | 66.7 | 45 |
| Magnesium perchlorate | 1.5 | 1.1 | |
| Water | 13.5 | 10.0 | |
| Formamide | | | 30 |
| Casting temperature | (1) | (1) | (2) |
| Solvent evaporation time | (3) | (3) | (4) |
| Duration of film setting in cold water | (5) | (5) | (5) |
| Nominal film thickness | (0.003 to 006 in. in all cases) | | |

¹ Minus 5 to −10° C.
² Lab. temp. ~24° C.
³ 4 minutes.
⁴ <1 minute.
⁵ ~1 hour.

However membranes cast in the above manner generally according to U.S. Pat. No. 3,133,132 are found in reverse osmosis separation to give a very high product rate, of the order of 300 gallons per day per square foot at 1500 p.s.i.g. with very little solute separation i.e. a low separation factor. It has been found as disclosed in U.S. Pat. No. 3,133,132 that solute separation in reverse osmosis separation of the membrane can be progressively increased by heating the membrane under water for short periods of time. Thus it is found that on progressively increasing the shrinkage temperature solute separation particularly with reverse osmosis of saline solutions can be increased but at the same time the product rate decreases. However, it is possible by such shrinkage procedures to increase the separation up to levels of greater than 98 or 99% and still maintain good product rates. Thus, in U.S. Pat. No. 3,133,132 the membrane is suitably shrunk by heating in warm water up to a temperature in the range of 77 to 83° C. and held at this temperature for at least an hour. In U.S. Pat. No. 3,133,137 the shrinkage procedure is improved by immersing the membrane in hot water at a temperature of from 84 and 90° C. for a period of from 18 minutes to 30 seconds depending upon the temperature to obtain the shrinking of the membrane.

Further, it has been found that the separation factor $f$ of the membrane, which as used herein is defined as $$f = \frac{\text{molality of solute in feed solution} - \text{molality of solute in product solution}}{\text{molality of solute in feed solution}}$$

may also be increased by subjecting the porous cellulose acetate membrane to a pressure treatment before using the membrane in reverse osmosis for a separation of the solvent from the solution which pressure treatment comprises pumping a liquid such as the solvent e.g. distilled water over the surface of the membrane subsequently contacted with the solution in the reverse osmosis separation at a pressure of about 15% higher than the maximum operating pressure applied during the reverse osmosis separation, for at least one hour.

Attempts have been made to increase the permeability of the reverse osmosis membrane to the solvent, i.e. increase the product rate; while at the same time substantially maintaining the separation factor of the membrane in the reverse osmosis separation. Such a process is disclosed for example in U.S. Pat. No. 3,250,701 wherein the reverse osmosis process the pressure applied to the membrane by the influx stream of the aqueous solution is intermittently relaxed. However, as will be shown hereinafter, the increase in product rate is found to be only temporary and the separation must be constant or decreasing over a long time. Further, in U.S. Pat. No. 3,355,382 in the desalination of a saline solution by reverse osmosis separation, the saline solution is subjected to an acceleration greater than gravity in a direction away from the membrane which is intended to prevent excessive concentration of the solute and excess accumulation of precipitates against the membrane and thus make the passage of water through the membrane independent of the solution circulation rate past the membrane.

However, heretofore no satisfactory method is available to increase the productivity of a given reverse osmosis membrane, i.e. to increase the product rate of a reverse osmosis membrane in a reverse osmosic separation and at the same time substantially maintain the separation factor for the membrane during the separation.

It has been found according to the present invention possible to increase the produt rate, i.e. the permeability of the membrane to the solvent in a reverse osmosis separation of the solvent from a solution and at the same time substantially maintain the separation factor of the membrane in the reverse osmosis separation by contacting the opposite side of said membrane, i.e. that side opposite to the one contacted by the feed solution during the reverse osmosis separation with a liquid under a pressure and for a sufficient time to effect said increase in permeability.

According to the present invention therefore there is provided a method of increasing the permeability of a reverse osmosis membrane without substantially reducing the separation factor which method comprises contacting one side of said membrane, from which liquid passing through the membrane is withdrawn in said reverse osmosis separation, with a liquid at a pressure and for a time sufficient to effect said increase in permeability.

It is believed that the reverse osmosis membrane produced by the process described for example in U.S. Pat. Nos. 3,133,132 and 3,133,137 are asymmetric and have a relatively very dense microporous structure in an extremely thin layer of about $10^{-5}$ of an inch of the membrane surface which was exposed to air during the casting. This surface of the film is referred to herein as the "top surface," the remainder of the film material underneath this top surface is believed to be a spongy porous mass containing comparatively very big pores. It is believed that it is the microscopic structure of the dense top surface layer governs the reverse osmosis separation and hence it is always held in contact with the feed solution during the reverse osmosis separation process. The other side of the membrane, i.e., the one which was in contact with the glass or metal plate or tube during casting is referred to herein as the "back surface" of the membrane and this back surface is believed to contain large interconnecting pores. In the as cast condition in which the membrane has a "primary gel structure" the surface pores are generally too large to give high levels of solute separation from aqueous solutions of inorganic salts such as sea water, and this pore size is reduced and thus the eparation factor increaed by shrinkage of the membrane to a "secondary gel structure" suitably by immersion in hot water and by adjusting the temperature of the hot water treatment, membranes of different porosities capable of giving different levels of solute separation can be obtained. When the shrunk membranes are subjected to a pressure treatment prior to their use in reverse osmosis separation by pumping a liquid and in particular pure water past the top surface of the membrane at a pressure about 15% higher than the maximum operating pressure during said reverse osmosis it is believed the entire secondary gel structure of the membrane is compacted to give a "tertiary gel structure" in which the capillary spaces are decreased resulting in a still more dense surface as well as interior structure and thus a greater separation factor is achieved with a smaller product rate in the reverse osmosis separation.

With the back pressure treatment of the membrane according to the present invention in which a liquid is fed under pressure to the back surface of the film, i.e., the one that is not contacted by the feed solution during the reverse osmosis separation, it is believed that the pores in the surface layer normally in contact with the solution during the reverse osmosis separation are widened and/or opened and such change is more selective with respect to the small pores than with the larger ones. In particular, it is believed that during the shrinkage of the membrane those pores on the surface layer of the membrane which were initially too big become smaller which, of course, is desirable to increase the separation factor and those which are initially smaller become still smaller which is undesirable as it reduces the overall membrane performance for any given reverse osmosis separation and in particular reduces the permeability of the membrane to the solvent, i.e., the product rate without substantially increasing the separation factor. The back pressure treatment according to the present invention, it is believed, re-opens and enlarges the smaller pores on a selective basis without substantially opening the larger pores. Thus, the back pressure treatment according to the present invention causes the liquid under pressure to permeate from the back surface to the top surface opening up the pores on the top surface and this treatment results in a new distribution of pores on the top surface with a higher average pore size. Further, it is believed that other advantageous structural changes probably also occur in the spongy porous mass underneath the top surface and it is possible to adjust the conditions of the back pressure treatment so the smaller pores are opened more than the larger ones because of the greater amplifying effect of the back pressure on the area of the smaller pores. Thus, it is believed that the porous cellulose acetate reverse osmosis membrane has an asymmetric and amorphous structure with extensive physical cross links in the membrane structure and the initial temperature and pressure treatments create additional cross links which contribute to the rigidity of the surface layer. During the back pressure treatment according to the present invention the pores on the surface layer are widened and/or opened, the change in pore size being more with respect to the smaller pores than the larger ones. Further, it is believed the back pressure treatment brings about significant viscoelastic deformations in the macromolecular structure of the surface layer, the extent of such deformation depends upon the secondary or tertiary gel structure existing in the membrane prior to the back pressure treatment. Due to such deformation the polymer flows and the macromolecules change their spatial distribution including the rearrangement of the physical cross links and the most probable distribution of end to end distances of polymer segments finally obtained is time dependent. Due to the long duration involved in the back pressure treatment the creep recovery is reduced, and a degree of permanent deformation is set in the membrane structure. Thus, the product rate, i.e., permeability of the solvent through the membrane by the reverse osmosis separation, can be increased by the back pressure treatment according to the present invention without substantially decreasing the separation factor under a given set of operating conditions.

Reverse osmosis separation using the back side of the membrane in contact with the feed solution has been carried out and has been disclosed for example in Loeb, S. and S. Sourirajan, "Sea Water Research," Department of Engineering, University of California, Los Angeles, Report No. 60–25, 1960, and Loeb, S. and S. Sourirajan, Seal Water Demineralization by Means of Semipermeable Membranes, Department of Engineering, University of California, Los Angeles, Report No. 60–60, 1961, and it was found that separation decreases drastically and for example, in a short time reverse osmosis separation with an aqueous solution containing 0.5% by weight of sodium chloride, 600 p.s.i.g. operating presssure with a particular porous cellulose acetate membrane, there was a 90.2% solute separation and a 47.4 grams per hour product rate when the surface layer of the membrane pressures necessarily used during the reverse osmosis and a pressure of 600 p.s.i.g. or more opens the pores of the membrane surface layer too much.

In contrast thereto it is possible in the back pressure treatment of the membrane according to the present invention by suitable selection of the pressure and period of application of said pressure to the back surface of the membrane which selection is in no way restricted by the pressure to be applied during the subsequent reverse osmosis separation, to modify the porous structure of the surface layer of the membrane by the correct amount to obtain the desired increase in product rate without substantial reduction in the separation factor during the subsequent reverse osmosis separation. The correct pressure and period of application of the membrane back surface is dependent upon the particular membrane and the conditions of subsequent reverse osmosis separation and thus general figures cannot be given. However, in any particular instance simple experimentation will supply the necessary parameter for effecting the back pressure treatment.

It has been further found that under reverse osmosis separation conditions the rate of permeation of the solution through the membrane, i.e. the product rate drops during continuous operation under pressure. This effect is illustrated in the following Table II which gives the separation factor $f$ and the product rate PR obtained for two different aqueous solutions of sodium chloride in reverse osmosis separation using nineteen asymmetric cellulose acetate membranes prepared according to the process of U.S. Pat. No. 3,133,132 the solution being fed to 7.6 square centimeters of the membrane in a cell disclosed in P.S. Pat. No. 3,133,132 at a feed rate of 250 cc. per minute and a pressure of 600 p.s.i.g. or 1500 p.s.i.g.

TABLE II

[Feed concentration: 0.5 wt. percent NaCl; operating pressure: 600 p.s.i.g.]

| Film No. | Start | | After 24 hours | | | After 72 hours | | |
|---|---|---|---|---|---|---|---|---|
| | $[PR]_1$, g./hr. | $f \times 10^2$ | $[PR]_2$, g./hr. | $f \times 10^2$ | $\dfrac{[PR]_2}{[PR]_1} \times 10^2$ | $[PR]_3$, g./hr. | $f \times 10^2$ | $\dfrac{[PR]_3}{[PR]_1} \times 10^2$ |
| 1 | 16.2 | 98.8 | 14.7 | 99.1 | 91.7 | | | |
| 2 | 21.4 | 98.5 | 19.8 | 99.1 | 92.5 | | | |
| 3 | 32.1 | 97.9 | 29.2 | 97.9 | 90.9 | | | |
| 4 | 33.4 | 96.7 | 28.4 | 97.2 | 85.1 | | | |
| 5 | 45.7 | 93.5 | 39.4 | 94.8 | 86.3 | | | |
| 6 | 57.5 | 84.1 | 48.7 | 87.5 | 84.7 | | | |
| 7 | 64.4 | 77.3 | 55.0 | 78.5 | 85.4 | 52.0 | 78.2 | 80.7 |
| 8 | 85.1 | 67.4 | 72.8 | 68.6 | 85.6 | 70.1 | 68.5 | 82.3 |
| 9 | 150.0 | 38.4 | 126.5 | 42.1 | 84.4 | 123.5 | 41.9 | 82.3 |
| 10 | 210.7 | 21.6 | 176.0 | 24.3 | 83.4 | 168.7 | 24.2 | 80.1 |
| 11 | 242.2 | 13.8 | 198.2 | 17.0 | 81.8 | 190.3 | 16.9 | 78.7 |
| 12 | 250.1 | 13.2 | 207.1 | 15.8 | 82.4 | 198.1 | 15.7 | 79.2 |

[Feed concentration: 0.5M NaCl; operating pressure: 1500 p.s.i.g.]

| 13 | 48.7 | 96.7 | 38.7 | 96.3 | 79.5 | | | |
| 14 | 73.1 | 87.0 | 56.1 | 86.5 | 76.8 | 52.1 | 86.1 | 71.3 |
| 15 | 98.3 | 67.6 | 76.3 | 68.4 | 77.6 | 69.2 | 60.0 | 70.4 |
| 16 | 161.6 | 36.2 | 122.3 | 37.9 | 75.7 | 114.4 | 26.9 | 70.8 |
| 17 | 170.3 | 34.1 | 129.9 | 34.0 | 76.3 | 120.9 | 23.5 | 71.0 |
| 18 | 229.3 | 15.7 | 175.0 | 17.5 | 76.3 | 161.7 | 9.1 | 70.5 |
| 19 | 250.5 | 11.4 | 191.1 | 12.6 | 76.3 | 178.4 | 6.0 | 71.2 | was in contact with the feed solution and when the separation was repeated with the back side of the same membrane in contact with the solution the product rate increased to 92.7 grams per hour and the solute separation decreased to 3.5%. Similar results were obtained at an operating pressure of 1500 p.s.i.g. using a 0.5 molal aqueous sodium chloride feed solution and with a particular membrane which gave 98.4% solute solution and 26.3 grams per hour product rate in a normal reverse osmosis separation and on contacting the feed solution on the back side of the membrane the solute separation was 0.5% and the product rate was 330.5 grams per hour. Mere reverse osmosis using the back side of the membrane in contact with the feed solution does not, in any way, provide a good reverse osmosis separation and it is believed that this is primarily due to the It will be seen from Table II that most of the dropping product rate occurs in the first 24 hours and in the reverse osmosis separation using an aqueous 0.5% sodium chloride feed solution at a pressure of 600 p.s.i.g., the product rate after 3 days of continuous operation is about 80% of the initial product rate while the level of the solute separation remains essentially the same or slightly better. It is considered that this is due to normal membrane compaction under pressure during which the porous structure of the dense top surface remains essentially intact but the spongy bulk mass of the film material underneath the top surface becomes progressively more dense and hence offers more resistance to liquid flow.

As will be illustrated hereinafter, the back pressure treated membranes of the present invention show similar characteristics with the product rate falling over similar periods of time by approximately the same amount and with a similar small variation in the separation factor. This means that the increase in product rate obtained by the back pressure treatment of the membrane according to the present invention is maintained during continuous reverse osmosis separation, i.e., the increase in product rate in a net gain.

The reverse osmosis asymmetric membrance which may be improved by the back pressure treatment of the present invention includes such polymer membranes as polyolefin, e.g. polyethylene and polypropylene, polyester, polyamide, and polysaccharide membranes. Cellulose ester such as cellulose acetate asymmetric membranes are preferred.

The method of improving the permeability of a reverse osmosis membrane to a solvent according to the present invention by the back pressure treatment has particular application to the aforesaid asymmetric porous cellulose ester membranes, particularly the asymmetric cellulose acetate membranes which are particularly useful in the separation of salt from aqueous solution, particularly in the demineralization of sea water. The liquid used to effect the back pressure treatment on the membrane according to the present invention may be any liquid for which the membrane has some natural sorptive capacity, i.e. wets or swells the membrane to at least a slight extent. In order to avoid inter alia contamination of the membrane during the initial stages of the reverse osmosis separation is preferably the same as the solvent forming the solution subjected to the reverse osmosis. Thus with the reverse osmosis separation of water from aqueous solutions water is preferably used for effecting the back pressure pretreatment of the membrane. Water is generally used for the back pressure treatment according to the present invention of the cellulose ester e.g. cellulose acetate membranes.

According to a preferred embodiment of the invention therefore there is provided in the separation of a solvent from a solution by reverse osmosis separation wherein an influx stream of said solution is fed to one side of the reverse osmoisis membrane at a pressure greater than the pressure necessary to cause flow across said membrane and solution having a reduced solute content is withdrawn from the other side of said membrane the improvement which comprises feeding through said other side of said membrane prior to said separation said solvent at a pressure and for a time sufficient to increase the permeability of said membrane to said solvent during said separation without substantially reducing the capability of said membrane to separate said solute from said solvent, i.e. without reducing the separation factor of said membrane in said reverse osmosis separation.

For example the asymmetric cellulose acetate membrane subjected to the back pressure treatment according the present invention as aforesaid is normally one which has been shrunk by heating in water. When the reverse osmosis separation in which the membrane is to be used is operated at relatively low pressure e.g. less than about 300 p.s.i.g., the shrunk membrane may be treated directly. However, when the operating pressure of the subsequent separation is average pressure the shrunk membrane is desirably subjected first to a normal break in pressure treatment by contact of the surface to be subsequently contacted with the feed solution with the solvent at a pressure about 15% higher than the operating pressure during separation. It has been found that when the separation is one that is conducted at relatively high pressure e.g. above about 800 p.s.i.g. such that the normal break-in pressure treatment must also be carried out at relatively high pressure (as will be illustrated hereinafter) the *subsequent* back pressure treatment, unless at very high pressures, gives little improvement in performance of the membrane during the reverse osmosis separation and it is desirable to obtain the improved performance in the membrane by the back pressure treatment which precedes the normal break-in pressure treatment. When the reverse osmosis separation is conducted at average pressures up to about 600–800 p.s.i.g. the back pressure treatment can precede or follow the normal break-in pressure treatment. Thus the initial porous structure of the cast film before shrinkage and pressure treatment, i.e. the primary gel structure is believed to be a three-dimensional network with excessive physical cross links and microporous containing both swelling water and non-swelling capillary water in both the surface layer and the interior spongy mass of the film. During the temperature (shrinkage) treatment, the polymer segments gets closer together, thereby increasing physical cross links and decreasing the capillary spaces. Consequently both the swelling water and the capillary water in the entire film material are reduced giving rise to a more dense surface as well as interior porous structure, referred to as the secondary gel structure.

The normal break-in pressure treatment compacts the entire porous structure bringing the polymer segments still closer together further increasing the physical cross links and decreasing the capillary spaces resulting in a still more dense surface as well as interial structure, i.e. produces the tertiary gel structure. Thus when normal break-in high pressure treatment of the shrunk membrane is effected, the compaction is such that the subsequent back pressure treatment is insufficient to modify the tertiary gel structure with a result that no improvement is obtained in the performance of the membrane. In this case the modification is effected upon the secondary gel structure, i.e. the membrane is subjected to the back pressure treatment before the conventional high pressure treatment in order that the improvement of the membrane in the subsequent reverse osmosis separation is achieved. The high pressure break-in treatment may then be effected upon the back pressure treated membrane.

The present invention will be further illustrated by way of the following examples in conjunction with the accompanying drawings.

In the accompanying drawings.

In the following examples all the membranes are asymmetric porous cellulose acetate membranes produced by the process disclosed in U.S. Pat. No. 3,133,132.

EXAMPLE 1

Six asymmetric porous cellulose acetate membranes were initially shrunk in hot water at different temperatures and subsequently normally pressure treated for one hour at 700 p.s.i.g. The membranes were then subjected to a reverse osmosis separation in a cell such as that disclosed in U.S. Pat. No. 3,133,132 in which they were subjected to feed stream of an aqueous sodium chloride solution containing 0.5% by weight sodium chloride at a feed rate of 250 cc. per minute, operating at a pressure of 600 p.s.i.g. on a membrane area of 7.6 square centimeters.

Figure 1:
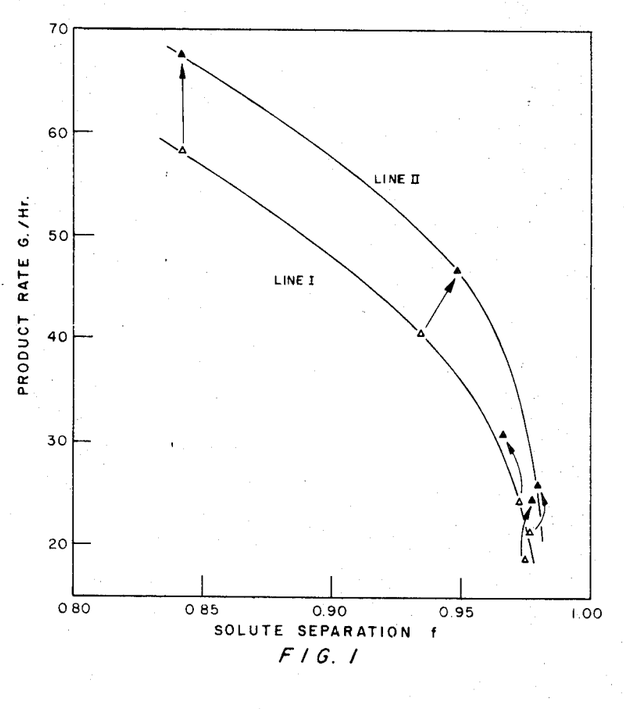
FIG. 1 is a graph showing the variation in product rate and solute separation in the reverse osmosis separation of water from an aqueous salt solution for a number of asymmetric porous cellulose acetate membranes shrunk at different temperatures before and after being subjected to the back pressure treatment according to one embodiment of the present invention.

The membranes were then subjected to a back pressure treatment which comprised pumping pure water at ambient temperature past the back side of the membrane at 400 p.s.i.g. for 85 hours. The back pressure treated membranes were then subjected to the same reverse osmosis separation as the untreated membrane. A plot of the product rates obtained in the reverse osmosis separation against the solute separation factor was made as shown in FIG. 1. In FIG. 1, line I, is the plot for the untreated membranes and line II is the corresponding plot for the same membranes which have been subjected to the back pressure treatment. It will be seen that line II is considerably above line I and the arrows indicate the change in performance of the individual membranes tested. It will be seen that as a result of the back pressure treatment the product rate increased by 15 to 30%, the solute separation either remained the same or was better in all cases except one in which the solute separation decreased by 0.6%. Thus it will be seen that the back pressure treatment according to the present invention improves membrane performance considerably.

The reverse osmosis separation with the back pressure treated membranes according to the present invention was continued for a period of 72 hours and the results are given in Table III.

EXAMPLE 2

Figure 2:
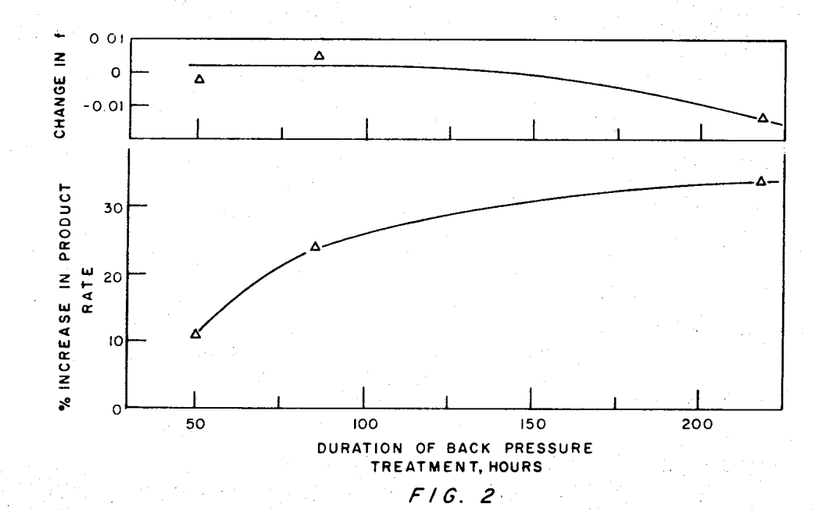
FIG. 2 is a graph showing the variation of the product rate and separation factor in the reverse osmosis separation of water from an aqueous salt solution for a number of asymmetric porous cellulose acetate membranes with variation in the period of back pressure at a constant applied back pressure.

A set of six asymmetric porous cellulose acetate membranes which had been preshrunk and normally pressure treated as in Example 1 giving solute separation in the range 85 to 99% were subjected to a back pressure treatment as in Example 1 under pressure of 400 p.s.i.g. for 50 hours. A similar set of six asymmetric porous cellulose acetate membranes were subjected to a back pressure treatment at 400 p.s.i.g. for 85 hours and a third set of six asymmetric porous cellulose acetate membranes were subjected to a similar back pressure treatment at 400 p.s.i.g. for 218 hours. The membranes were then subjected to a reverse osmosis precisely in the same manner as in Example 1 and the variation in product rate and solute separation were determined. The results obtained are given in FIG. 2 from which it will be seen that the product rate increased significantly and that the solute separation changed less than 1%. Thus FIG. 2 gives the average change obtained in each set six membranes and it will be seen that a duration of 145 hours at that pressure treatment at 400 p.s.i.g gave an average increase in product rate of 30% with substantially no change in the separation factor in the reverse osmosis separation. Further, it will be seen that with 85 hours back pressure at 400 p.s.i.g. the average increase in product rate was 23% and there was, in fact, a slight increase in solute separation and this back pressure and period of treatment was considered optimum for use in the demineralization of salt water.

EXAMPLE 3

Figure 3:
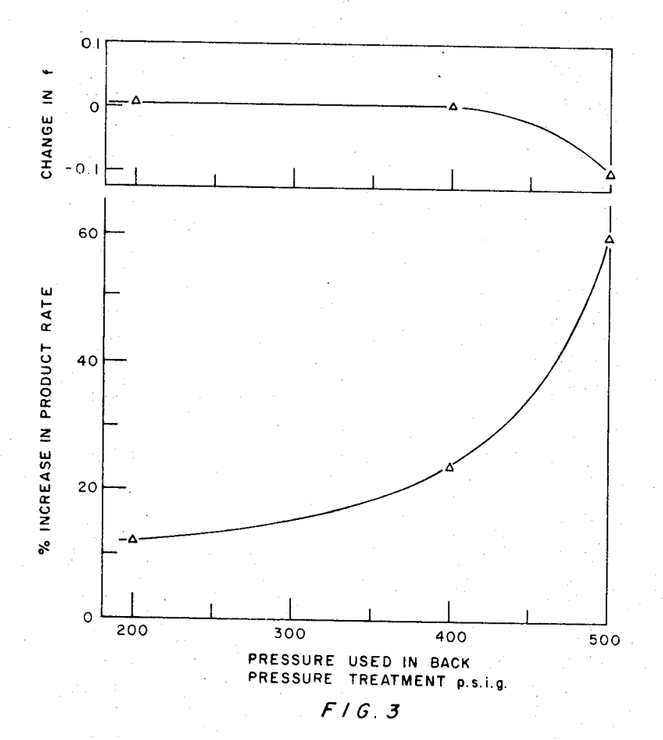
FIG. 3 is a graph showing the variation in product rate and separation factor in the reverse osmosis separation of water from an aqueous salt solution for asymmetric porous cellulose acetate membranes with variation of the back pressure at a constant period of application thereof.

Three sets of six asymmetric porous cellulose acetate membranes were subjected to back pressures of 200, 400 and 500 p.s.i.g. for a constant period of time of 85 hours in a similar manner to the process of Example 2 and then subjected to a similar reverse osmosis of an aqueous sodium chloride solution as in Example 2 and the increase in product rate and the variation of the separation factor were plotted against the back pressure used. The results obtained are given in FIG. 3 from which it will be seen that the gain in product rate increased with the increase in pressure used for back pressure treatment but with pressures higher than 400 p.s.i.g., the solute separation tended to decrease. Consequently, a back pressure treatment at 400 p.s.i.g. for 85 hours appears to give the TABLE III.—PERFORMANCE OF POROUS CELLULOSE ACETATE MEMBRANES BEFORE AND AFTER BACK PRESSURE TREATMENT

| Film No. | Before back pressure treatment | | After back pressure treatment at 400 p.s.i.g. for 85 hours | | | | | | | | | |
|---|---|---|---|---|---|---|---|---|---|---|---|---|
| | Start | | Start | | $\left[\dfrac{[PR]_2}{[PR]_1}\right] \times 10^2$ * | After 24 hours | | | $\dfrac{[PR]_3}{[PR]_2} \times 10^2$ | After 72 hours | | $\dfrac{[PR]_4}{[PR]_2} \times 10^2$ |
| | $[PR]_1$, g./hr. | $f \times 10^2$ | $[PR]_2$, g./hr. | $f \times 10^2$ | | $[PR]_3$, g./hr. | $f \times 10^2$ | | | $[PR]_4$, g./hr. | $f \times 10^2$ | |
| 1 | 18.7 | 97.5 | 24.5 | 97.8 | 31.0 | 21.1 | 98.0 | | 86.1 | 20.4 | 98.1 | 83.2 |
| 2 | 21.4 | 97.7 | 25.9 | 98.0 | 21.0 | 22.8 | 98.1 | | 88.0 | 22.1 | 98.1 | 85.3 |
| 3 | 24.3 | 97.3 | 30.5 | 96.6 | 25.6 | 27.3 | 96.9 | | 89.5 | 26.6 | 96.9 | 87.3 |
| 4 | 40.7 | 93.5 | 46.9 | 94.9 | 15.3 | 41.5 | 95.1 | | 88.5 | 41.3 | 94.7 | 88.2 |
| 5 | 58.3 | 84.3 | 67.5 | 84.3 | 15.9 | 60.1 | 86.3 | | 89.0 | 58.8 | 85.4 | 87.2 |

\* Percent increase in product rate by back pressure treatment.
PR = Product rate; f = Separation factor.

It will be seen from Table III that the structure of the surface layer of the back pressure treated membrane remains stable under the reverse osmosis conditions and further that the reduction in product rate obtained due to membrane compaction during the extended operation is no more than that obtained with membranes which were not subjected to back pressure treatment as will be seen by a direct comparison with Table II given heretofore. Thus the 15 to 30% increase in product rate obtained by the back pressure treatment according to the present invention is a net gain in the productivity of the membrane for saline water conversion and similar applications.

maximum increase approximately 20 to 25% in product rate with substantially no decrease in solute separation in reverse osmosis separations at 600 p.s.i.g. with respect to cellulose acetate asymmetric membranes capable of giving more than 80% solute separation with respect to 0.5% by weight sodium chloride in water solutions.

EXAMPLE 4

Figure 4:
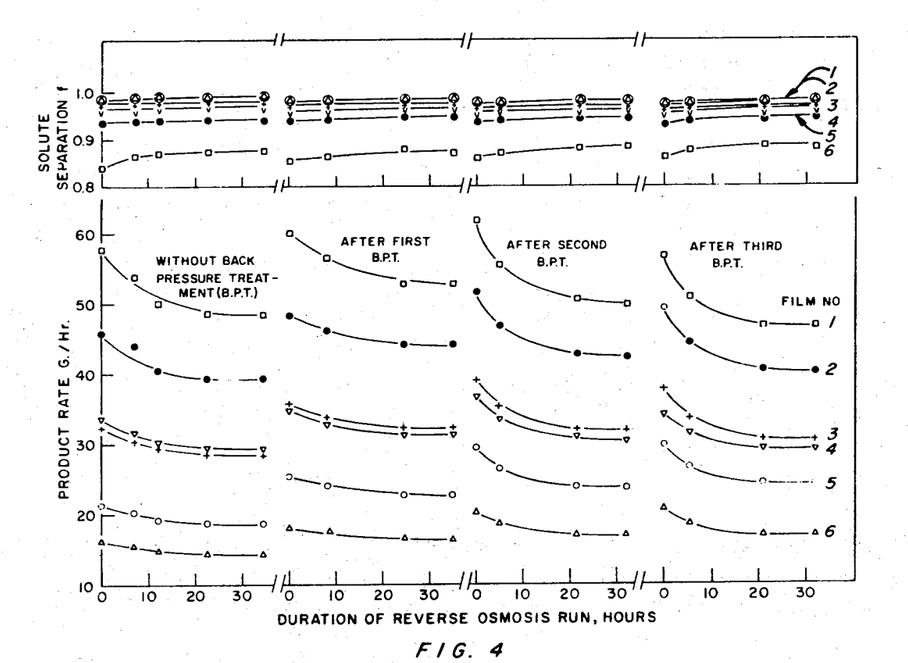
FIG. 4 is a graph of the variation of solute separation factor and product rate in the reverse osmosis separation of water from an aqueous salt solution with time over a prolonged period of time for a number asymmetric porous cellulose acetate membranes with intermittent application of back pressure according to one embodiment of the present invention.

In a similar manner to Example 3 six different asymmetric porous cellulose acetate membranes were shrunk and normally pressure treated as in Example 1 and then subjected to a reverse osmosis separation of an aqueous solution of sodium chloride as in Example 1 for 30 hours. At the end of 30 hours the reverse osmosis separation was stopped and the membranes subjected to a back pressure treatment as in Example 3 at 400 p.s.i.g. for 85 hours. The reverse osmosis separation was then continued for a further 30 hours, stopped, a second back pressure treatment as in Example 3 was effected, the reverse osmosis continued for another 30 hours, stopped, a further back pressure treatment was effected as in Example 3 and the reverse osmosis separation continued for another 30 hours. Plots of product rate and solute separation against the duration of the reverse osmosis separation was plotted, the results obtained are given in FIG. 4. It will be seen from FIG. 4 that the back pressure treatment according to the present invention is effective, even when applied repeatedly. However after the first back pressure treatment, the gain in product rate was partially offset by an increase in membrane compaction and consequently no more than two back pressure treatments appears to be desirable for obtaining the best benefit of the process of the present invention.

Figure 5:
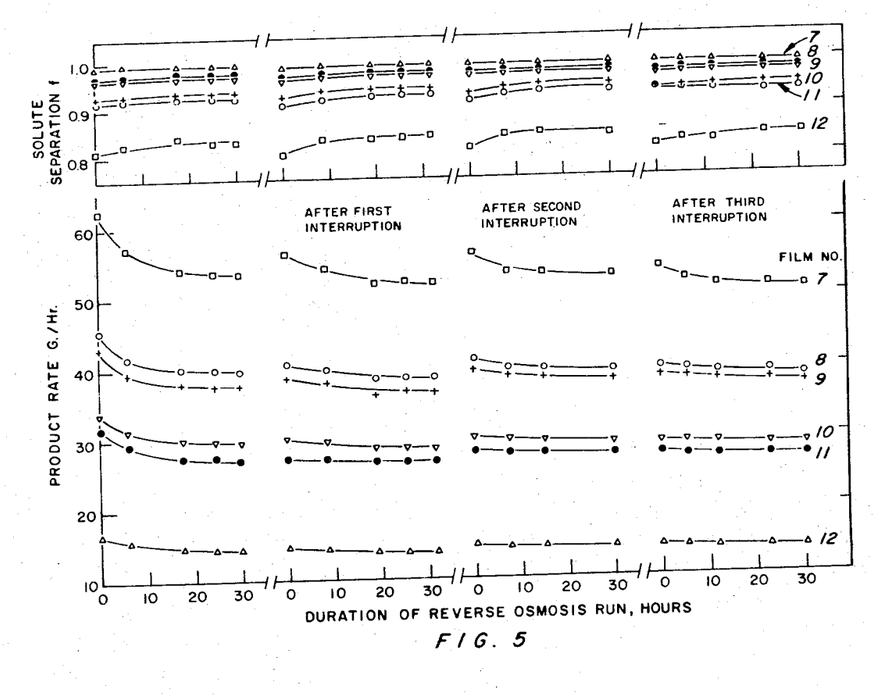
FIG. 5 is a similar graph as in FIG. 4, except the back pressure treatment was omitted and the reverse osmosis pressure merely intermittently relaxed according to the process of U.S. Pat. No. 3,250,701.

As a comparison a further six membranes were taken and instead of the back pressure treatment according to the present invention the reverse osmosis separation was merely interrupted at 30 hour intervals in accordance with the process of U.S. Pat. No. 3,250,701 and again product rate and solute separation were plotted against the duration of the reverse osmosis separation. The results obtained are given in FIG. 5, each interruption lasting for 2 or 3 days. On comparison of the results obtained in FIG. 5 with those in FIG. 4 it will be seen that the increase in product rate obtained by interruption and release of the pressure in a long time continuous reverse osmosis separation is only about 3 to 5% and even then the increase is temporary. In contrast thereto, with the back pressure treatment according to the present invention a much higher increase in product rate, 20 to 25%, is obtained and the latter is a net increase in the productivity of the membrane as has been stated earlier.

EXAMPLE 5

In a similar manner to Example 3 three sets of five asymmetric porous cellulose acetate membranes, all cut from the same membrane sheet and subjected to a temperature treatment to effect pre-shrinking thereof were taken, one set of membranes was subjected to a back pressure treatment according to Example 3 at 400 p.s.i.g. for 85 hours, another set was subjected to a back pressure treatment at 250 p.s.i.g. for 85 hours, and the third set was not subjected to any back pressure treatment. The back pressure treated membranes were all subsequently subjected to a normal pressure treatment at 1,700 p.s.i.g.

The membranes which were not subjected to a back pressure treatment and the membranes that were given a back pressure treatment of 250 p.s.i.g. for 85 hours were subjected to a 24 hour continuous reverse osmosis as in Example 1 except that the pressure was 1,500 p.s.i.g. instead of 600 p.s.i.g. and the membranes which were given a back pressure treatment at 400 p.s.i.g. for 85 hours were given a shorter reverse osmosis separation at the same pressure. The results obtained are given in Table IV from which it will be seen that the back pressure treatment of the preshrunk membrane before normal pressure treatment increases the product rate by an average amount of 10 to 15% without any significant change in the solute separation in the reverse osmosis separation at 1500 p.s.i.g.

TABLE IV

| Membrane group | Pressure used for B.P.T.[1], p.s.i.g. | Reverse osmosis experimental data | | | | |
|---|---|---|---|---|---|---|
| | | Initial values | | | Average values after 24 hours | |
| | | [PR], g./hr. | $f \times 10^2$ | Average values | [PR] / [PR] initial | [PR] Change, $f \times 10^2$ |
| 1 | (²) | 50.0 | 97.7 | [PR]=51.1, $f \times 10^2$=96.7 | 0.76 | −0.6 |
| | | 49.0 | 97.0 | | | |
| | | 51.4 | 97.5 | | | |
| | | 52.2 | 95.9 | | | |
| | | 52.8 | 95.4 | | | |
| 2 | 250 | 57.3 | 97.6 | [PR]=55.7, $f \times 10^2$=97.4 | 0.755 | −0.3 |
| | 250 | 57.3 | 97.8 | | | |
| | 250 | 59.3 | 96.7 | | | |
| | 250 | 54.2 | 98.4 | | | |
| | 250 | 50.6 | 96.4 | | | |
| 3 | 400 | 58.5 | 96.8 | [PR]=58.2, $f \times 10^2$=96.6 | | |
| | 400 | 58.0 | 96.7 | | | |
| | 400 | 57.6 | 96.9 | | | |
| | 400 | 60.1 | 96.5 | | | |
| | 400 | 56.9 | 96.2 | | | |

[1] Back pressure treatment.
[2] No B.P.T.

The compaction effect for the back pressure treated membrane is no different from that for the membrane without any back pressure treatment and thus the increase in product rate obtained by the back pressure treatment is a net gain in productivity of the membrane under the conditions of continuous operation. Back pressure treatment at 400 p.s.i.g. gives results better than those obtained with the same treatment at 250 p.s.i.g.

However, in contrast to the above when the shrunk membrane was subjected to the normal break-in pressure treatment at 1,700 p.s.i.g. before the back pressure treatment it was found that the performance of the back pressure treated membrane in the range of 200 to 900 p.s.i.g. for periods of 65 to 150 hours in the subsequent reverse osmosis separation according to the above was either the same or worse than before the back pressure treatment, i.e. the product rate increased and the solute separation decreased. This indicates that whereas normal pressure treated membrane at 700 p.s.i.g. as in Examples 1 to 4 on being subjected to the back pressure treatment produces substantial improvement in performance during the subsequent reverse osmosis separation, the compaction effect due to normal break-in pressures of 1,700 p.s.i.g. made the membrances more resistant to subsequent deformation under the back pressure treatment according to the present invention, i.e. the membranes were probably too rigid to be substantially changed by such back pressure treatment. Hence with such high pressure treatment to change the structure of the membrane by the back pressure treatment of the present invention this should be done prior to such normal high pressure treatment of the shrunk film.

It will be readily seen therefore that the back pressure treatment according to the present invention provides a general method of improving the performance of asymmetric reverse osmosis membranes in reverse osmosis separation of solutions and can be used to change either the secondary or tertiary gel structure of the membrane and the duration and pressure employed for the back pressure treatment is chosen to suit the particular application and the nature of the membrane structure prior to such treatment.

We claim:

1. A method of altering the pore structure and increasing the permeability of a reverse osmosis asymmetric membrane without substantially reducing its separation factor which comprises contacting the side of said membrane having the larger pore openings and from which liquid passing through the membrane is withdrawn in reverse osmosis separations, with a liquid at a pressure causing a significant back-flow of liquid and enlargement of the smaller pore openings on the opposite side of the membrane, and for a time sufficient to effect a stable enlargement of said smaller pore openings and said increase in permeability.

2. In the separation of a solvent from a solution by reverse osmosis separation wherein an influx stream of said solution is fed to one side of the reverse osmosis asymmetric membrane and solvent having reduced solute content is withdrawn from the other side of said membrane having the larger pore openings, the improvement which comprises feeding to said other side of said membrane prior to said reverse osmosis separation a liquid at a pressure causing a significant back-flow of liquid and enlargement of the smaller pore openings on the one side of the membrane and a time sufficient to effect stable enlargement of said smaller pore openings and increase the permeability of said membrane to said solvent during said separation without substantially reducing the capability of said membrane to separate said solute from said solvent.

3. A method as claimed in claim 2 in which the liquid is said solvent.

4. A method as claimed in claim 2 in which the membrane is a cellulose ester membrane.

5. A method as claimed in claim 2 in which the membrane is a cellulose acetate membrane.

6. A method as claimed in claim 2 in which the membrane is prepared by dissolving film forming cellulosic ester and a pore producing agent in an organic solvent, casting said solution to form a membrane of substantially uniform thickness, evaporating a portion of said organic solvent for a predetermined period of time said casting and evaporating being accomplished with said solution cooled to below room temperature, immersing the cast membrane in water to remove the pore producing agent, and shrinking the membrane by heating in water.

7. A process as claimed in claim 6 in which the membrane is shrunk by immersing in hot water to a temperature of at least 50° C.

8. A method as claimed in claim 5 in which the liquid is water.

9. A process as claimed in claim 6 in which the reverse osmosis separation is effected at average pressure of 300 to 800 p.s.i.g. and the shrunk membrane is subjected to a pressure treatment before said separation by feeding the liquid to said one side of said membrane at a pressure higher than the maximum operating pressure of said separation for at least one hour.

10. A process as claimed in claim 6 in which the reverse osmosis separation is a high pressure separation above about 800 p.s.i.g. and the shrunk membrane is subjected to a pressure treatment before said reverse osmosis by feeding the solvent to said one side of said membrane at a pressure higher than the maximum operating pressure of said reverse osmosis separation for at least one hour the back pressure treatment of said other side of said membrane being effected before said pressure treatment.

11. A process as claimed in claim 6 in which the reverse osmosis separation is effected at relatively low pressure below about 300 p.s.i.g. and the shrunk membrane is subjected to treatment of said other side for increasing permeability without any subsequent normal break-in pressure treatment.

12. A process as claimed in claim 2 in which the feeding of the liquid to said other side of said membrane is effected prior to contact of said one side of said membrane with said solution.

13. A process as claimed in claim 12 in which the feeding of the liquid to said other side of said membrane occurs additionally during at least one interruption of said reverse osmosis separation.

14. A process as claimed in claim 2, in which the solution is of an inorganic salt in water and the other side of said membrane is contacted with water.

15. A process as claimed in claim 14 in which the separation is the disalination of saline, brackish or sea water.

16. A process as claimed in claim 2, in which the solution is of an organic substance in water and the other side of said membrane is contacted with water.

17. A process as claimed in claim 2 in which the solution is of an organic substance in an organic solvent.

18. An asymmetric reverse osmosis membrane treated by the process as claimed in claim 1.

19. A process as claimed in claim 1 in which the pressure is from 200 to 500 p.s.i.g. for a period of from 50 to 200 hours.

20. A process as claimed in claim 1 in which the pressure is from 300 to 450 p.s.i.g. for a period of 80 to 150 hours.

References Cited

UNITED STATES PATENTS 3,355,382   11/1967   Huntington _________ 210—22

REUBEN FRIEDMAN, Primary Examiner

R. BARNES, Assistant Examiner

U.S. Cl. X.R.

210—321